United States Patent [19]
Prinssen et al.

[11] Patent Number: 5,665,225
[45] Date of Patent: Sep. 9, 1997

[54] SEPARATING DEVICE

[75] Inventors: Alphons Arnoldus Johannes Antonius Prinssen, Den Bosch; Karel Antoon Thissen, Utrecht, both of Netherlands

[73] Assignee: Pannevis B.V., Netherlands

[21] Appl. No.: 488,717

[22] Filed: Jun. 8, 1995

[30] Foreign Application Priority Data

Jun. 9, 1994 [NL] Netherlands ............................ 9400942

[51] Int. Cl.⁶ .............................. B01D 33/80; B01D 33/04
[52] U.S. Cl. .......................... 210/141; 210/400; 210/401; 210/406
[58] Field of Search ..................................... 210/400, 401, 210/406, 416.1, 141, 107; 209/272, 307; 55/290, 351, 352, 353

[56] References Cited

U.S. PATENT DOCUMENTS

| | | | |
|---|---|---|---|
| 2,688,406 | 9/1954 | Holland | 210/401 |
| 4,038,193 | 7/1977 | Oosten | 210/400 |
| 4,186,090 | 1/1980 | van Oosten | 210/400 |
| 4,595,501 | 6/1986 | Queyroix | 210/406 |
| 5,308,487 | 5/1994 | Thissen | 210/406 |
| 5,443,725 | 8/1995 | Thissen | 210/406 |

FOREIGN PATENT DOCUMENTS

| | | |
|---|---|---|
| 7210541 | 2/1974 | Netherlands . |
| 8303016 | 3/1985 | Netherlands . |

*Primary Examiner*—Joseph W. Drodge
*Attorney, Agent, or Firm*—Webb Ziesenheim Bruening Logsdon Orkin & Hanson, P.C.

[57] ABSTRACT

The invention relates to a device for separating liquids and solids. An endless filter belt is used, beneath which a suction box is placed which can generate underpressure relative to the ambient pressure. The suction box is bounded on at least one of the sides by a stationary underpressure box, wherein the suction box is provided with a connecting element co-acting with the underpressure box. This enables embodying of the connection between the suction box and this underpressure box without for example rubber connecting hoses. This is important because rubber material cannot for instance withstand high temperatures.

10 Claims, 2 Drawing Sheets

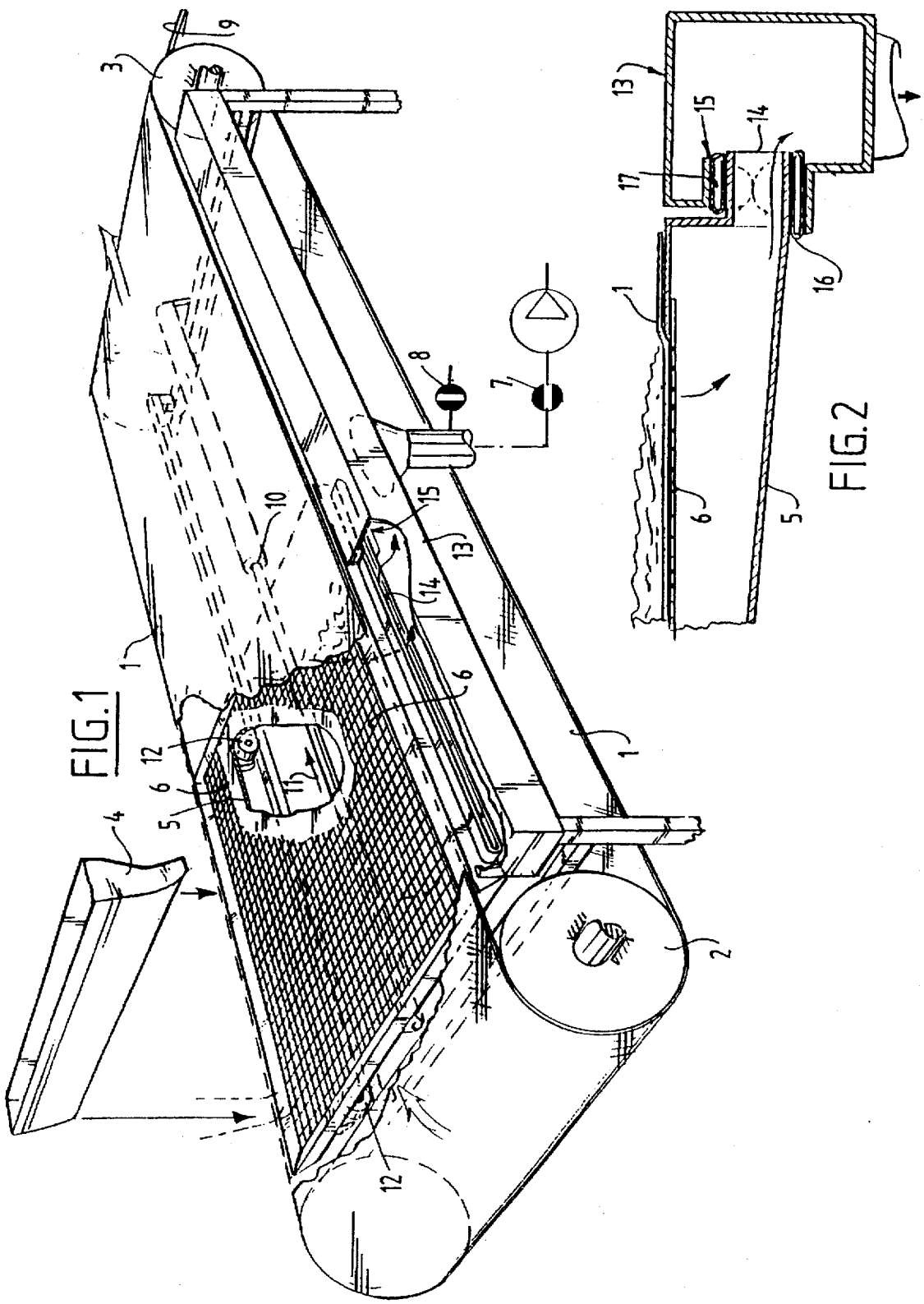

SEPARATING DEVICE

BACKGROUND OF THE INVENTION

1. Field of the Invention

The invention relates to a device for separating liquids and solids from a mixture, with an endless filter belt, means for supplying mixture to the filter belt, at least one suction box supporting the filter belt, located under the filter belt and moving along with the filter belt, which suction box is connected to an underpressure device for generating a lower pressure relative to the ambient pressure, and control means for alternately generating this lower pressure and ambient pressure in the suction box, and discharge means connected to the suction box.

2. Description of the Prior Art

Such a device is known from the Netherlands patent application 72.10541.

In the known device the suction box is connected to the underpressure device by means of hose connections. This causes various drawbacks. Due to the possible cross-sectional size of the hose the amount of air and liquid which can be sucked through is limited. Because they are bent the hoses cause an undesired force transversely of the direction of movement of the filter. This force is relatively great and varies during the movement of the suction box. In addition, as a result of the material of the hose, rubber, it is not possible to apply higher temperatures. A final drawback is that the reciprocating mass is comparatively large as a result of the weight of hose and coupling means.

SUMMARY OF THE INVENTION

The invention has for its object to obviate these drawbacks. This is achieved according to the invention in that the suction box is bounded on at least one of the sides by a stationary underpressure box and the suction box is provided with connecting means co-acting with the underpressure box.

By placing a stationary underpressure box on the side of the suction box it is possible to embody the connection between the suction box and this underpressure box without rubber hoses. According to a preferred embodiment it is for instance possible to opt for a slot-like opening in the underpressure box, wherein the suction box is movable with a connecting piece in lengthwise direction through this slot-like opening. The mass displaced during the reciprocating movement is thus limited to that of the suction box itself. There are in addition no limitations imposed by the material of the connecting means for the temperature of the mixture for separating. Finally, it is possible to choose the cross-sectional size of the connecting piece of the suction box such that there is no limitation in respect of the amount of air and liquid which can be drawn through, so that the capacity of the device can be chosen as required.

In order to close the slot-like opening on either side of the moving connecting piece of the suction box, the suction box and the underpressure box are equipped with mutually co-acting sealing means.

The invention is further elucidated with reference to the drawings.

BRIEF DESCRIPTION OF THE DRAWINGS

In the figures:

FIG. 1 shows a perspective view of the first embodiment of the invention,

FIG. 2 shows a sectional view of a part or the embodiment of FIG. 1, and

DESCRIPTION OF THE PREFERRED EMBODIMENTS

Figure 3:
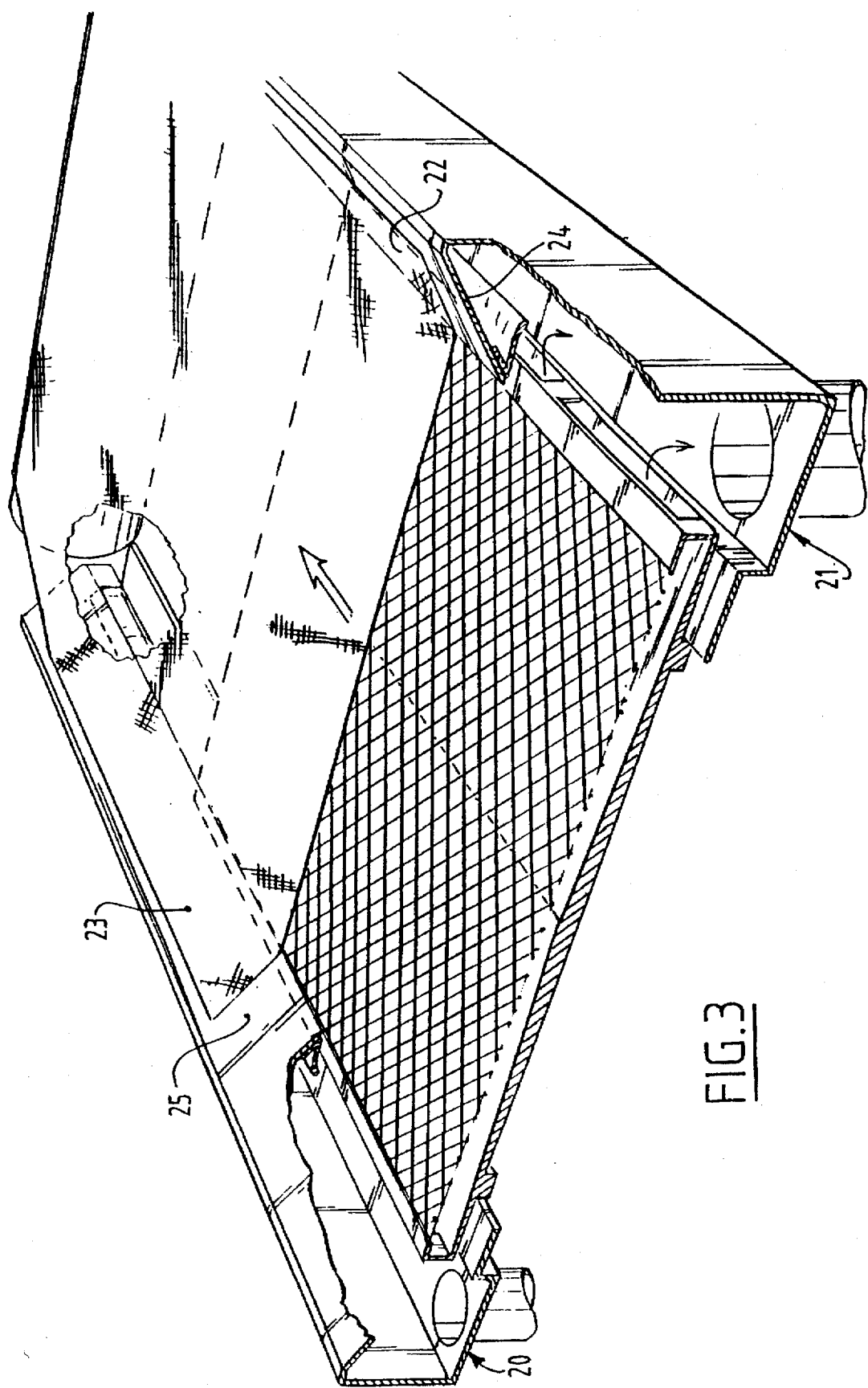
FIG. 3 is a perspective view of an alternative embodiment.

The separating device according to the invention comprises an endless filter belt which is trained round drive rollers 2, 3. From a feed hopper 4 the mixture for separating is supplied to the upper part of filter belt 1. Arranged under the filter belt is a suction box 5 which on the top side takes the form of a grid with a chosen mesh width 6. The suction box 5 is connected by means of valves 7, 8 to means (not drawn) for generating vacuum. At the end of the upper part of filter belt 1 the product is discharged via means 9 intended for that purpose.

Conected to the suction box 5 is a cylinder-piston construcion 10 which provides suction box 5 with a resetting force. In the movement according to arrow 11 and the return movement the suction box 5 is guided over roller tracks 12. The guiding can also take place over slide tracks (not shown).

According to the invention the suction box 5 is bounded on at least one side by a stationary underpressure box 13. The suction box 5 protrudes with a connecting piece 14 into the slot-like opening of the underpressure box 13. Sealing means 16, 17 are placed between the slot-like opening 15 and connecting piece 14. The underside of suction box 5 is formed by a bottom plate placed in inclining position. The placing of this bottom plate out of alignment increases the hydraulic capacity of suction box 5.

The separating device according to FIG. 1 and 2 operates as follows. By generating underpressure in suction box 5 a coupling is created between the moving filter belt 1 and the suction box. Suction box 5 is carried along by the belt and the product for separating is sucked in by the suction box 5 and discharged via the underpressure box 13. At the end of the work stroke the underpressure is released, whereby suction box 5 is detached from the filter belt 1. The piston-cylinder construction 10 produces a resetting force whereby suction box 5 moves back to the beginning of the work stroke. The above described operation is then repeated.

According to an alternative embodiment as in FIG. 3, underpressure boxes 20, 21 are placed on either side of filter belt 1. In this embodiment the filter belt at 22, 23 lies at the sides on the respective sloping parts 24, 25 of the respective suction boxes 21, 20. Sealing means can be situated at the position where suction box 5 connects onto boxes 20, 21. The operation is the same as that of the embodiment of FIG. 1.

We claim:

1. A device for separating liquids and solids from a mixture, said device comprising:

an endless filter belt; means for supplying a mixture to the filter belt; a suction box supporting the filter belt, wherein the at least one suction box is located under the filter belt and is configured and arranged to move along the filter belt; an underpressure device operable for generating a lower pressure relative to an ambient pressure; at least one stationary underpressure box connected to the underpressure device; control means for alternately generating the lower pressure and ambient pressure in the suction box; and discharge means connected to the suction box, wherein the suction box is bounded on at least one side by a stationary underpressure box and for each underpressure box, the suction box including connecting means co-acting with the underpressure box such that the suction box is reciprocally movable along the stationary underpressure box.

2. The device as claimed in claim 1, wherein, for each underpressure box, the underpressure box has a slot-like opening, the connecting means includes a connecting piece extending from the suction box, and each respective connecting piece is configured to slidably engage the respective opening such that the suction box is movable in a lengthwise direction along the respective openings of the at least one underpressure box.

3. The device as claimed in claim 1, including a stationary underpressure box located adjacent each side of the suction box with the suction box having connecting means co-acting with each stationary underpressure box.

4. A device for separating liquids and solids from a mixture, said device comprising:

an endless filter belt; means for supplying a mixture to the filter belt; suction box supporting the filter belt, wherein the suction box is located under the filter belt and is configure and arranged to move among the filter belt; an underpressure device operable for generating a lower pressure relative to an ambient pressure; at least one stationary underpressure box connected to the underpressure device; control means for alternately generating the lower pressure and ambient pressure in the suction box; and discharge means connected to the suction box, wherein the suction box is bounded on at least one side by a stationary underpressure box and for each underpressure box, the suction box includes connecting means co-acting with the underpressure box such that the suction box is movable along the stationary underpressure box and wherein the suction box and the underpressure box have mutually co-acting sealing means.

5. A device for separating liquids and solids from a mixture, said device comprising an endless filter belt; means for supplying a mixture to the filter belt; a suction box supporting the filter belt, wherein the suction box is located under the filter belt and is configured and arranged to move along the filter belt; an underpressure device operable for generating a lower pressure relative to an ambient pressure; at least one stationary underpressure box connected to the underpressure device; control means for alternately generating the lower pressure and ambient pressure in the suction box; and discharge means connected to the suction box, wherein the suction box is bounded on at least one side by a stationary underpressure box, and wherein for each stationary underpressure box, the suction box includes connecting means co-acting with the underpressure box such that the suction box is reciprocally movable along the stationary underpressure box, the underpressure box has a slot-like opening, the connecting means includes a connecting piece extending from the suction box, which connecting piece is configured to slidably engage the opening such that the suction box is movable in a lengthwise direction along the opening of the underpressure box, and wherein the suction box and the underpressure box have mutually co-acting sealing means.

6. The device as claimed in claim 5, further including a cylinder-piston assembly connected to the suction box to move the suction box in a lengthwise direction along the slot-like opening of the at least one underpressure box.

7. A device for separating liquids and solids from a mixture, the device comprising:

an endless filter belt;

a reciprocating suction box located under the filter belt, the suction box including at least one connecting piece extending therefrom; and at least one stationary underpressure box located adjacent a respective side of the suction box and extending along the filter belt, wherein for each underpressure box, the underpressure box includes a longitudinal slot and a respective connecting piece engages the longitudinal slot such that the suction box is reciprocally movable along the slot.

8. The device as claimed in claim 7, further including, for each underpressure box, a sealing element positioned around the connecting piece in the slot.

9. The device as claimed in claim 7, wherein the suction box has an interior, and for each underpressure box, the connecting piece is in flow communication with the interior of the suction box, the underpressure box has an interior and the connecting piece extends into the slot such that the interior of the suction box is in flow communication with the interior of the underpressure box and the connecting piece is slidable along the slot of the underpressure box.

10. The device as claimed in claim 7, including a stationary underpressure box located adjacent each side of the suction box with a connecting piece extending between the suction box and each underpressure box.

* * * * *

UNITED STATES PATENT AND TRADEMARK OFFICE
CERTIFICATE OF CORRECTION

PATENT NO. : 5,665,225
DATED : September 9, 1997
INVENTOR(S) : Alphons A.J.A. Prinssen et al.

It is certified that error appears in the above-identified patent and that said Letters Patent is hereby corrected as shown below:

Column 2 Line 1 "or the embodiment" should read --of the embodiment--.

Column 2 Line 18 "Conected" should read --Connected--.

Column 2 Lines 18-19 "construcion" should read --construction--.

Claim 4 Column 3 Line 21 after the semicolon and before "suction box" insert --a--.

Claim 4 Column 3 Line 23 "configure" should read --configured--.

Claim 4 Column 3 Line 23 "among" should read --along--.

Claim 5 Column 3 Line 39 after "comprising" insert colon --:--.

Claim 7 Column 4 Line 28 after "wherein" insert comma --,--.

Signed and Sealed this

Twentieth Day of January, 1998

Attest:

BRUCE LEHMAN

*Attesting Officer*  *Commissioner of Patents and Trademarks*